US012711042B2

(12) United States Patent
Choi et al.

(10) Patent No.: US 12,711,042 B2
(45) Date of Patent: Aug. 18, 2026

(54) METHOD AND APPARATUS FOR COLLECTING DATA OF COMPUTING APPARATUS

(71) Applicant: 42DOT INC., Seoul (KR)

(72) Inventors: Seong Yong Choi, Hwaseong (KR); Heung Sik Eom, Siheung (KR)

(73) Assignee: 42DOT INC., Seoul (KR)

( * ) Notice: Subject to any disclaimer, the term of this patent is extended or adjusted under 35 U.S.C. 154(b) by 32 days.

(21) Appl. No.: 18/784,665

(22) Filed: Jul. 25, 2024

(65) Prior Publication Data

US 2025/0036553 A1 Jan. 30, 2025

(30) Foreign Application Priority Data

Jul. 27, 2023 (KR) ........................ 10-2023-0098229

(51) Int. Cl.
*G06F 11/362* (2025.01)

(52) U.S. Cl.
CPC .................................. *G06F 11/366* (2013.01)

(58) Field of Classification Search
CPC ............... G06F 11/366; G06F 11/0703; G06F 11/0793; G06F 11/0778; G06F 11/0739; G06F 11/0787; G06F 11/1441
See application file for complete search history.

(56) References Cited

U.S. PATENT DOCUMENTS 9,977,914 B1 * 5/2018 Paczkowski ........ G06F 21/6218
2003/0212936 A1 * 11/2003 Neuman ............. G06F 11/2268 714/E11.147
2009/0031166 A1 * 1/2009 Kathail ............... G06F 11/0706 711/E12.002
2014/0173357 A1 * 6/2014 Anderson ........... G06F 11/0727 714/45
2018/0095681 A1 * 4/2018 Swanson ............. G06F 11/0787
2020/0333976 A1 * 10/2020 Cariello ................... G01K 3/00
2022/0374513 A1 * 11/2022 Huh ........................ G06F 21/53
2024/0160530 A1 * 5/2024 Das ..................... G06F 11/0778

FOREIGN PATENT DOCUMENTS

KR 10-2023-0089448 A 6/2023

OTHER PUBLICATIONS

Analysis of Method to Collect Information in case of Power on Reset in Automotive ECUs, 2021 Korean Institute of Communication Sciences Winter Comprehensive Academic Conference, Bae Jae-hyun et al.
KR Office Action dated Jan. 26, 2026.

* cited by examiner

*Primary Examiner* — Omar F Fernandez Rivas
(74) *Attorney, Agent, or Firm* — Harvest IP Law, LLP

(57) ABSTRACT

Provided are a method and device for collecting data of a computing device. The method of collecting data of a computing device includes, in response to a reset of the computing device, determining whether the reset corresponds to a warm reset, based on the reset corresponding to the warm reset, loading error dump data, generating and storing extended error dump data based on the error dump data, and loading a kernel, and initializing the error dump data, wherein the error dump data is recorded in volatile memory, and the extended error dump data is stored in non-volatile memory.

8 Claims, 8 Drawing Sheets

METHOD AND APPARATUS FOR COLLECTING DATA OF COMPUTING APPARATUS

CROSS-REFERENCE TO RELATED APPLICATION

This application is based on and claims priority under 35 U.S.C. § 119 to Korean Patent Application No. 10-2023-0098229, filed on Jul. 27, 2024, in the Korean Intellectual Property Office, the disclosure of which is incorporated by reference herein in its entirety.

BACKGROUND

1. Field

The present disclosure relates to a method and device for collecting data of a computing device.

2. Description of the Related Art

During an operation of a computing device, an intended shutdown or reset may be executed for various reasons, and unexpected causes such as memory intrusion or excessive interrupts may lead to an abnormal shutdown or reset of the computing device.

In particular, for computing devices installed in vehicles, because the vehicle operates in various environments, situations where the computing device experiences abnormal shutdowns or resets may frequently occur due to factors such as ambient temperature, vibrations occurring in the vehicle, or power status.

When a shutdown or reset occurs regardless of whether the shutdown or reset is intentional or abnormal, it may be important to recover data prior to the shutdown or reset, and to restore the operational state prior to the shutdown or reset.

In addition, when a shutdown or reset occurs, analyzing and identifying the causes of the shutdown or reset is important to prevent further shutdowns or resets, and preserving data may also be important for analyzing and identifying the causes of the shutdown or reset.

The above-mentioned background art is technical information possessed by the inventor for the derivation of the present disclosure or acquired during the derivation of the present disclosure, and cannot necessarily be said to be a known technique disclosed to the general public prior to the filing of the present disclosure.

SUMMARY

Provided are methods and devices for collecting data of a computing device. Technical objectives of the present disclosure are not limited to the foregoing, and other unmentioned objects or advantages of the present disclosure would be understood from the following description and be more clearly understood from the embodiments of the present disclosure. In addition, it would be appreciated that the objectives and advantages of the present disclosure may be implemented by means provided in the claims and a combination thereof.

Additional aspects will be set forth in part in the description which follows and, in part, will be apparent from the description, or may be learned by practice of the presented embodiments of the disclosure.

According to a first aspect of the present disclosure, a method of collecting data of a computing device includes, in response to a reset of the computing device, determining whether the reset corresponds to a warm reset, based on the reset corresponding to the warm reset, loading error dump data, generating and storing extended error dump data based on the error dump data, and loading a kernel, and initializing the error dump data, wherein the error dump data is recorded in volatile memory, and the extended error dump data is stored in non-volatile memory.

According to a second aspect of the present disclosure, a device for collecting data of a computing device includes a memory storing at least one program, and a processor configured to execute the at least one program to, in response to a reset of the computing device, determine whether the reset corresponds to a warm reset, based on the reset corresponding to the warm reset, load error dump data, generate and store extended error dump data based on the error dump data, load a kernel, and initialize the error dump data, wherein the error dump data is recorded in volatile memory, and the extended error dump data is stored in non-volatile memory.

According to a third aspect of the present disclosure, there may be provided a computer-readable recording medium having recorded thereon a program for executing, on a computer, the method according to the first aspect.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
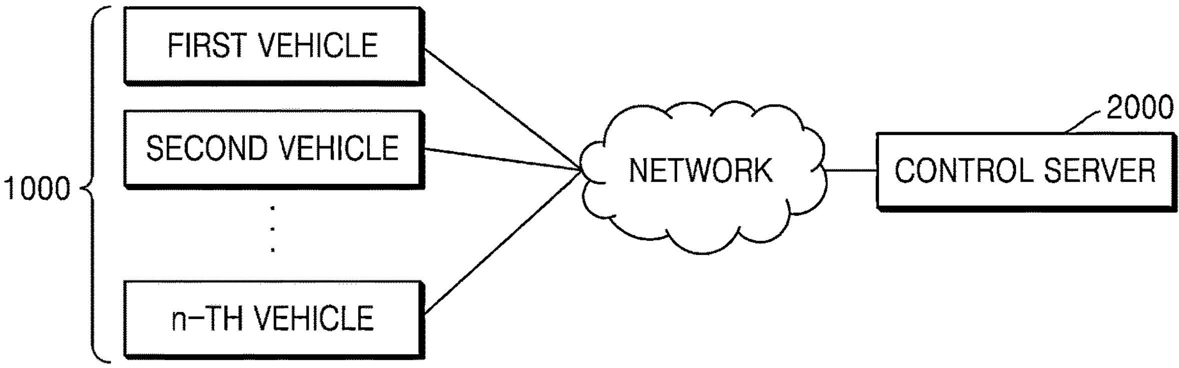
FIG. 1 is a diagram illustrating an example of a system including a vehicle and a control server, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of skill in the art. In describing the present disclosure, detailed explanations of the related art are omitted when it is deemed that they may unnecessarily obscure the gist of the present disclosure.

Terms used herein are merely used to describe a particular embodiment, and are not intended to limit the present disclosure. The singular expression also includes the plural meaning as long as it does not inconsistent with the context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of hardware and/or software elements that perform particular functions. For example, the functional blocks of the present disclosure may be embodied by at least one microprocessor or by circuit components for a certain function. In addition, for example, the functional blocks of the present disclosure may be implemented by using various programming or scripting languages. The functional blocks may be implemented by using various algorithms executable by one or more processors. Furthermore, the present disclosure may employ known technologies for electronic settings, signal processing, and/or data processing. Terms such as "mechanism", "element", "unit", or "component" are used in a broad sense and are not limited to mechanical or physical components.

In addition, connection lines or connection members between components illustrated in the drawings are merely exemplary of functional connections and/or physical or circuit connections. Various alternative or additional functional connections, physical connections, or circuit connections between components may be present in a practical device.

Hereinafter, the term 'vehicle' may refer to all types of transportation instruments with engines that are used to move passengers or goods, such as cars, buses, motorcycles, kick scooters, or trucks.

Hereinafter, the present disclosure will be described in detail with reference to the accompanying drawings.

FIG. 1 is a diagram illustrating an example of a system including a vehicle and a control server, according to an embodiment.

A system according to an embodiment may include one or more vehicles 1000 and a control server 2000.

The one or more vehicles 1000 may communicate with each other or other nodes via a network.

The one or more vehicles 1000 may also be understood as devices mounted on the one or more vehicles 1000, respectively.

In an embodiment, the device mounted on each of the one or more vehicles 1000 may include an autonomous driving device. The autonomous driving device may refer to a device that is mounted on each of the one or more vehicles 1000 and is configured to implement an autonomous driving vehicle.

The device mounted on each of the one or more vehicles 1000 may include various sensors (including cameras) for collecting situational information around the vehicle. For example, the device mounted on each of the one or more vehicles 1000 may detect a movement of a preceding vehicle that is driving in front, through an image sensor and/or an event sensor mounted on the front side of the vehicle 1000. The device mounted on each of the one or more vehicles 1000 may further include sensors for detecting, in addition to the preceding vehicle, another vehicle driving in an adjacent lane, and pedestrians around the vehicle 1000. The device mounted on each of the one or more vehicles 1000 may further include various types of sensors for collecting information about surroundings of the vehicle 1000.

Figure 2:
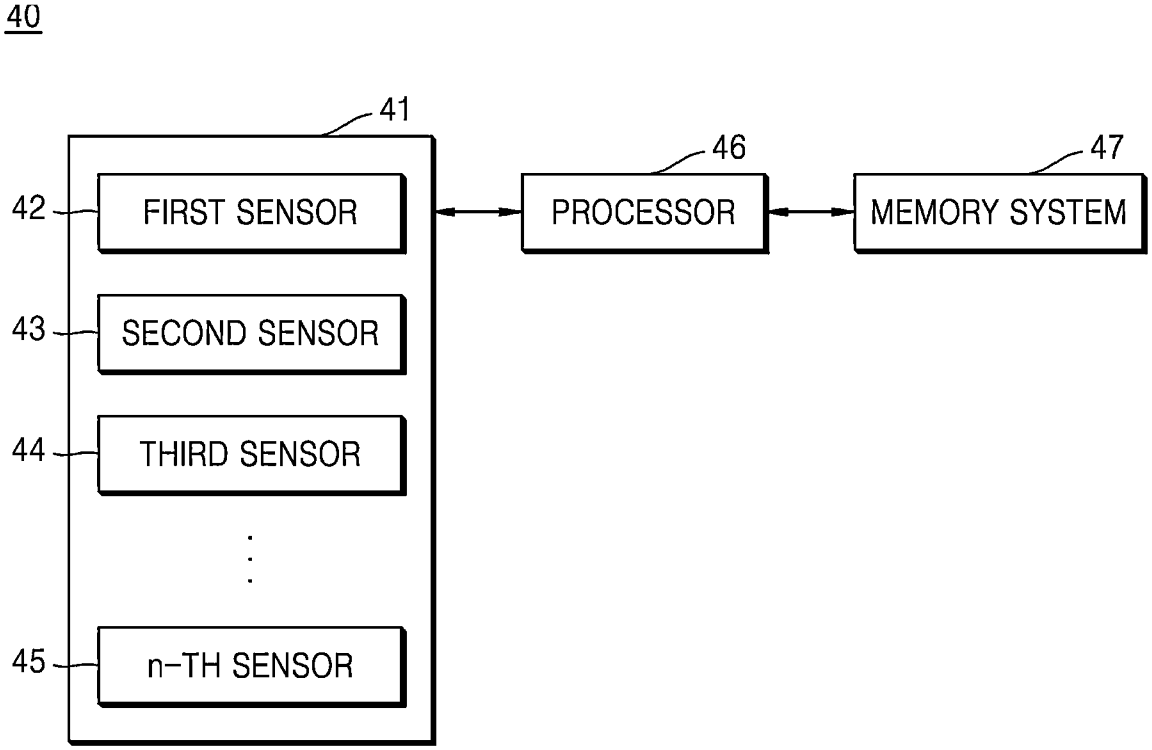
FIG. 2 is a diagram schematically illustrating a device mounted on a vehicle, according to an embodiment.

FIG. 2 is a diagram schematically illustrating a device mounted on a vehicle, according to an embodiment.

A device 40 mounted on a vehicle of FIG. 2 may be the device mounted on each of the one or more vehicles 1000 described above with reference to FIG. 1.

Referring to FIG. 2, the device 40 mounted on the vehicle may include a sensor unit 41, a processor 46, a memory system 47, and the like. The device 40 mounted on the vehicle may further include a body control module (BCM) (not shown).

The sensor unit 41 may include a plurality of sensors (including cameras) 42 to 45, and the plurality of sensors 42 to 45 may include sensors for collecting information about the vehicle itself or information about surrounding environments of the vehicle, such as an image sensor, an event sensor, an illuminance sensor, a global positioning system (GPS) device, or an acceleration sensor.

Data collected by the sensors 42 to 45 may be delivered to the processor 46. The processor 46 may store, in the memory system 47, the data collected by the sensors 42 to 45, and control the body control module based on the data collected by the sensors 42 to 45 to determine a movement of the vehicle. The memory system 47 may include two or more memory devices and a system controller configured to control the memory devices. Each of the memory devices may be provided as a single semiconductor chip.

In addition to the system controller of the memory system 47, each of the memory devices included in the memory system 47 may include a memory controller, which may include an artificial intelligence (AI) computation circuit such as a neural network. The memory controller may generate computational data by applying certain weights to data received from the sensors 42 to 45 or the processor 46, and store the computational data in a memory chip.

Referring back to FIG. 1, the device mounted on each of the one or more vehicles 1000 may transmit data collected from various sensors to devices mounted on other vehicles or to the control server 2000.

In detail, the device mounted on each of the one or more vehicles 1000 may be a smart phone, a tablet personal computer (PC), a PC, a smart television (TV), a mobile phone, a laptop, or other mobile or non-mobile computing device. In addition, the device mounted on each of the one or more vehicles 1000 may be a wearable device having a communication function and a data processing function, such as glasses or a hair band. The device mounted on each of the one or more vehicles 1000 may include any type of device capable of communicating with other devices through a network.

For example, the device mounted on each of the one or more vehicles 1000 may include a touch screen, i.e., a touch input unit. The touch screen refers to a screen on which certain information may be input through a gesture of a user, and examples of gestures of the user may include tap, double tap, press (i.e., touch-and-hold), long press, drag, panning, flick, drag-and-drop, release, and the like.

The control server 2000 may be implemented as a computer device or a plurality of computer devices that provide a command, code, a file, content, a service, and the like by performing communication through a network.

The one or more vehicles 1000 and the control server 2000 may perform communication by using a network. The control server 2000 may transmit and receive data to and from the one or more vehicles 1000 through a network, and may perform various control functions of the control server 2000 or assist in driving of the one or more vehicles 1000.

Data that may be collected from the one or more vehicles 1000 and then transmitted through a network may include data about the one or more vehicles 1000 themselves, such as the model year and type of the vehicle, data collected in relation to the surrounding environment of the vehicle, data collected for determining the internal condition of the one or more vehicles 1000, such as temperature or fuel level, data about people associated with the one or more vehicles 1000, such as drivers or passengers, and the like.

Hereinafter, operations performed by a device for collecting data of a computing device according to various embodiments of the present disclosure will be described. The device for collecting data of a computing device of the present disclosure may be the device mounted on each of the one or more vehicles 1000 of FIG. 1, or a device separately provided from the device mounted on each of the one or more vehicles 1000. Alternatively, the device for collecting data of a computing device may be understood to be included in the device mounted on each of the one or more vehicles 1000.

In addition, a computing device from which data is to be collected may be the device mounted on the each of one or more vehicles 1000 of FIG. 1, or a device included in the device mounted on the each of the vehicles 1000. Accordingly, the device to perform an operation of collecting data of a computing device, and the device from which data is collected may be the same device or may be separate devices.

Hereinafter, the term "reset" may mean that a computing device is powered off and then powered back on, regardless of whether this is due to a manipulation by a user, due to a program running on the computing device, or due to an unexpected cause.

The device for collecting data of a computing device of the present disclosure may generate and record data in preparation for a reset of the computing device. When a reset of the computing device occurs, the device for collecting data of a computing device of the present disclosure may analyze the type of the reset of the computing device. The device for collecting data of a computing device of the present disclosure may load data that has been generated and recorded in preparation for a reset of the computing device, and store the data in another memory, based on the type of the reset, in a suitable manner.

As described above, the device for collecting data of a computing device of the present disclosure may generate and record data in preparation for a reset of the computing device. In the present disclosure, error dump data may refer to data that is generated and recorded by the device for collecting data of a computing device in preparation for a reset of the computing device. The error dump data may be basic data for analyzing the cause of a reset of the computing device.

In an embodiment, the structure of the error dump data may be formed to include data of a fixed-width format. An example of a structure of error dump data may be expressed as shown in Table 1 below.

TABLE 1

| | | | | |
|---|---|---|---|---|
| | magic_number | | | fault_type |
| | saved_cpu | | | panic_cpu |
| temp | temp_frac | | pad0 | |
| | | linux_banner | | |
| | pid | | | comm |
| | p_pid | | | p_comm |
| | type | | | pad1 |
| | | timestamp | | |
| | | contex | | |
| | | uptime | | |
| | | process_info | | |
| | | mount_info | | |
| | | schedule_info | | |

In the example of Table 1, the types of data corresponding to variables used in a structure of error dump data may be expressed as in Table 2 below.

TABLE 2

| | |
|---|---|
| magic_number | Unique key value |
| fault_type | Reason of restart |
| saved_cpu | Number of core that collected, recorded, or stored data |
| panic_cpu | Number of core where fault occurred |
| temp | Integer part of temperature value |
| temp_frac | Fractional part of temperature value |
| pad0 and pad1 | Empty space for memory data alignment |
| linux_banner | Linux banner |
| pid | ID of process |
| comm | Name of process |
| p_pid | ID of parent process of pid |
| p_comm | Name of parent process of pid |
| type | Internally defined booting type |
| timestamp | Current time (tick value) |
| context | SoC register value |
| uptime | Time since startup (tick value) |
| process_info | Information structure of process |
| mount_info | Information structure of disk |
| schedule_info | Historical record information structure |

In Table 2, the key value may refer to a value that serves as the basis for verifying the validity of data, as will be described below.

In an embodiment, error dump data may be recorded in volatile memory. That is, in an embodiment, the device for collecting data of a computing device may record the generated error dump data in volatile memory. The error dump data may be recorded in the volatile memory based on the structure of the error dump data described above.

For example, the volatile memory may include random-access memory (RAM), such as dynamic random-access memory (DRAM) or static random-access memory (SRAM), cache memory, graphics card memory, a dynamic RAM disk, and the like.

In the present disclosure, extended error dump data is described as a concept distinct from error dump data. In the present disclosure, the extended error dump data may further include additional records in addition to error dump data, for effectively analyzing the cause of a reset of the computing device. The additional records that may be included in the extended error dump data may include a log from a kernel and a log from a bootloader.

In an embodiment, the structure of the extended error dump data may be a more extended structure than the structure of the error dump data described above. In an embodiment, the structure of the extended error dump data may be formed to additionally include data of a variable-width format, in addition to the structure of the error dump data described above. For example, the structure of the extended error dump data may be formed to include string data. For example, the log from the kernel and the log from the bootloader may be string data. An example of a structure of extended error dump data may be expressed as shown in Table 3 below.

TABLE 3

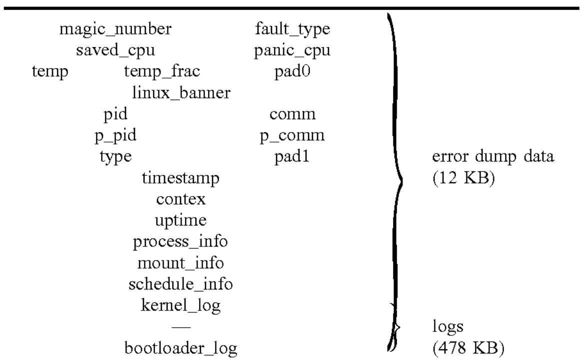

| Fields | | | Region |
|---|---|---|---|
| magic_number | | fault_type | error dump data (12 KB) |
| saved_cpu | | panic_cpu | |
| temp | temp_frac | pad0 | |
| linux_banner | | | |
| pid | | comm | |
| p_pid | | p_comm | |
| type | | pad1 | |
| timestamp | | | |
| contex | | | |
| uptime | | | |
| process_info | | | |
| mount_info | | | |
| schedule_info | | | |
| kernel_log | | | logs (478 KB) |
| — | | | |
| bootloader_log | | | |

In the present disclosure, the extended error dump data may be stored in non-volatile memory. That is, in an embodiment, the device for collecting data of a computing device may load the error dump data, then generate extended error dump data, and store the extended error dump data in non-volatile memory. The extended error dump data may be stored in the non-volatile memory based on the structure of the extended error dump data described above.

For example, the nonvolatile memory may include a hard disk drive (HDD), a solid-state drive (SSD), flash memory, embedded MultiMediaCard (eMMC), electrically erasable programmable read-only memory (EEPROM), and the like.

In an embodiment, the stored extended error dump data may be queried by a user. For example, the user of the device for collecting data of a computing device may query the extended error dump data stored in the nonvolatile memory. The user may check various pieces of information through the extended error dump data to analyze the cause of a reset generated by the computing device.

Figure 3:
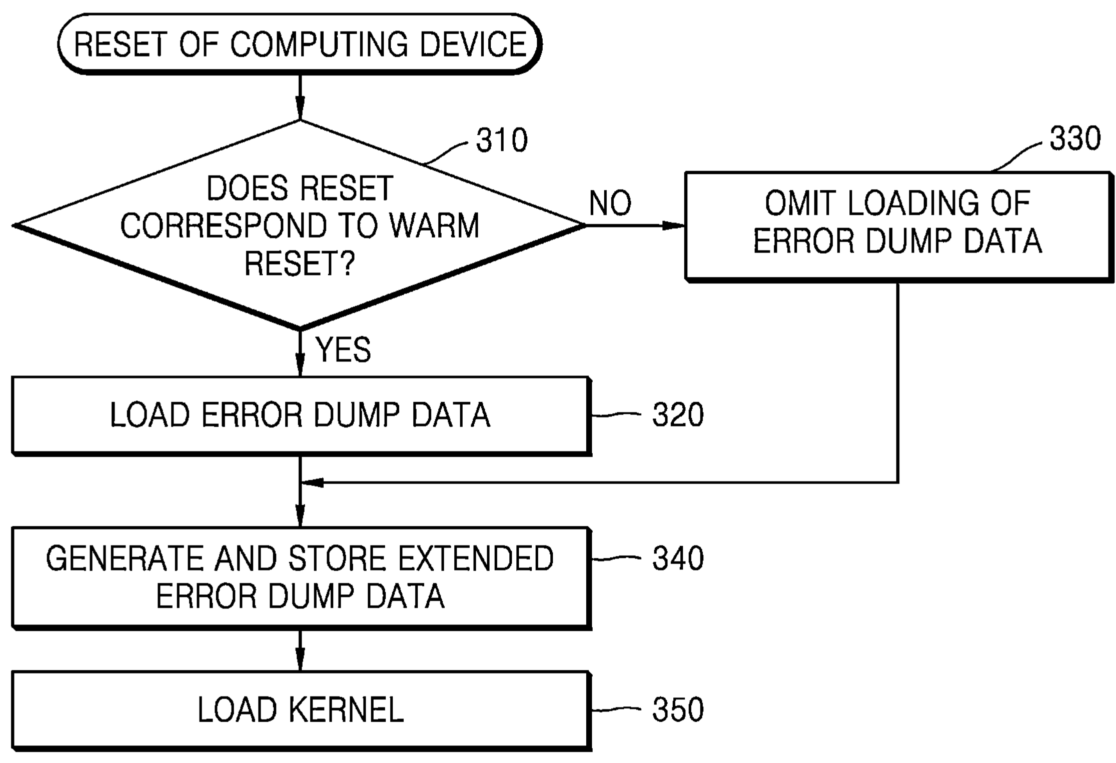
FIG. 3 is a flowchart illustrating a process in which, in response to a reset of a computing device, a device for collecting data of a computing device loads a kernel, according to an embodiment of the present disclosure.
Figure 4:
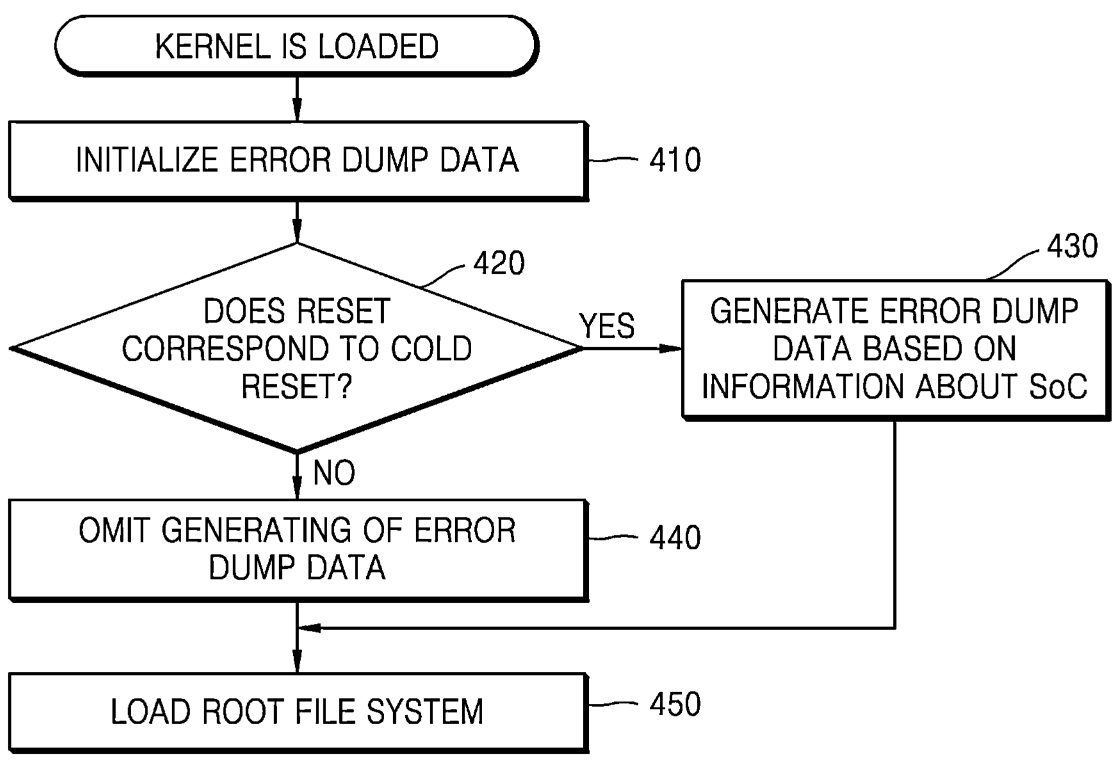
FIG. 4 is a flowchart for describing a process in which a device for collecting data of a computing device loads a root file system, according to an embodiment of the present disclosure.

The description referring to FIGS. 3 and 4 pertains to a process from when a reset of the computing device occurs until booting is completed.

FIG. 3 is a flowchart illustrating a process in which, in response to a reset of a computing device, a device for collecting data of a computing device loads a kernel, according to an embodiment of the present disclosure.

The process of loading the kernel illustrated in FIG. 3 may be understood as being performed after a reset of the computing device occurs.

Referring to FIG. 3, in an embodiment, in response to a reset of the computing device, the device for collecting data of a computing device may determine whether the reset corresponds to a warm reset (310).

In an embodiment, the device for collecting data of a computing device may determine whether the reset corresponds to a warm reset, by verifying the validity of preserved data. In an embodiment, when it is determined that the preserved data is valid, the device for collecting data of a computing device may determine that the reset corresponds to a warm reset. In an embodiment, when it is determined that the preserved data is invalid, the device for collecting data of a computing device may determine that the reset corresponds to a cold reset.

In an embodiment, the preserved data may be data preserved in a reserved region of volatile memory (e.g., DRAM). That is, the device for collecting data of a computing device may verify the validity of data stored in the reserved region of the volatile memory. In an embodiment, the device for collecting data of a computing device may verify the validity of the preserved data based on a key value of the data. The key value is a value of redundant data that has a value if the data is valid, and may refer to, for example, the first value of the data. That is, the device for collecting data of a computing device may determine, based on the first value of the preserved data being 1, that the preserved data is valid, and determine, based on the first value of the preserved data not being 1, that the preserved data is invalid.

Referring to FIG. 3, in an embodiment, when the reset corresponds to a warm reset, the device for collecting data of a computing device may load error dump data (320). In an embodiment, the error dump data may have been recorded in the volatile memory. As will be described below, the loading of the error dump data by the device for collecting data of a computing device may be for the purpose of subsequently generating extended error dump data.

In an embodiment, the loading (320) of the error dump data by the device for collecting data of a computing device may include loading a log from a kernel. When the log from the kernel is recorded along with the error dump data, the log from the kernel may also be loaded together.

Referring to FIG. 3, in an embodiment, when the reset does not correspond to a warm reset, the device for collecting data of a computing device may omit the loading of the error dump data (330). A case in which the reset does not correspond to a warm reset may correspond to a case in which the reset corresponds to a cold reset.

Referring to FIG. 3, in an embodiment, the device for collecting data of a computing device may generate and store extended error dump data (340).

As illustrated in FIG. 3, the generating and storing (340) of the extended error dump data by the device for collecting data of a computing device may be performed regardless of whether the reset corresponds to a warm reset. However, when the reset corresponds to a warm reset, i.e., when the device for collecting data of a computing device has loaded the error dump data (320), the extended error dump data may include the error dump data. On the contrary, when the reset does not correspond to a warm reset, i.e., when the device for collecting data of a computing device has omitted the loading of the error dump data (330), the extended error dump data may not include the error dump data. In this case, part corresponding to the error dump data in the structure of the extended error dump data may be blank.

As described above, the extended error dump data may include a log from a bootloader. In an embodiment, the generating and storing (340) of the extended error dump data by the device for collecting data of a computing device may include storing the log from the bootloader.

In the above-described embodiment in which the log from the kernel is loaded, the generating and storing (340) of the extended error dump data by the device for collecting data of a computing device may include storing the log from the kernel.

Referring to FIG. 3, in an embodiment, after generating and storing the extended error dump data, the device for collecting data of a computing device may load the kernel (350). A kernel may refer to software that is responsible for a core part of an operating system of a computer.

FIG. 4 is a flowchart for describing a process in which a device for collecting data of a computing device loads a root file system, according to an embodiment of the present disclosure.

The process of loading the root file system illustrated in FIG. 4 may be understood as being performed after a reset of the computing device occurs.

Referring to FIG. 4, in an embodiment, after a kernel is loaded, the device for collecting data of a computing device may initialize error dump data (410). The device for collecting data of a computing device may initialize the error dump data in order to generate and record error dump data based on new information.

Referring to FIG. 4, in an embodiment, after initializing the error dump data, the device for collecting data of a computing device may determine whether a reset corresponds to a cold reset (420).

In an embodiment, the device for collecting data of a computing device may determine whether the reset corresponds to a cold reset, based on a reset-reason-register. The reset-reason-register may refer to a location where the cause of the reset is recorded.

Referring to FIG. 4, in an embodiment, when the reset corresponds to a cold reset, the device for collecting data of a computing device may generate error dump data based on information about a system-on-chip (SoC) (430). In a specific embodiment, when the reset corresponds to a cold reset, the device for collecting data of a computing device may generate error dump data based on the cause, and date and time of a reset of the SoC, and temperature information about the SoC. In an embodiment, the generated error dump data may be recorded in the volatile memory.

Referring to FIG. 4, in an embodiment, when the reset does not correspond to a cold reset, the device for collecting data of a computing device may omit the generating of the error dump data (440). A case in which the reset does not correspond to a cold reset may correspond to a case in which the reset corresponds to a warm reset.

Referring to FIG. 4, in an embodiment, the device for collecting data of a computing device may load a root file system (450). The root file system is an uppermost layer of a file system, and may refer to a file system used to configure all files and directories in the system. The device for collecting data of a computing device may prepare access to all resources of the file system, by loading the root file system.

As illustrated in FIG. 4, the loading (450) of the root file system by the device for collecting data of a computing device may be performed regardless of whether the reset corresponds to a cold reset.

In addition, in an embodiment, when the reset corresponds to a cold reset, after the device for collecting data of a computing device loads the root file system (450), the error dump data may be stored in the non-volatile memory. In detail, in an embodiment, the device for collecting data of a computing device may generate and store extended error dump data based on the generated error dump data. In an embodiment, the extended error dump data may be stored in the non-volatile memory.

Figure 5:
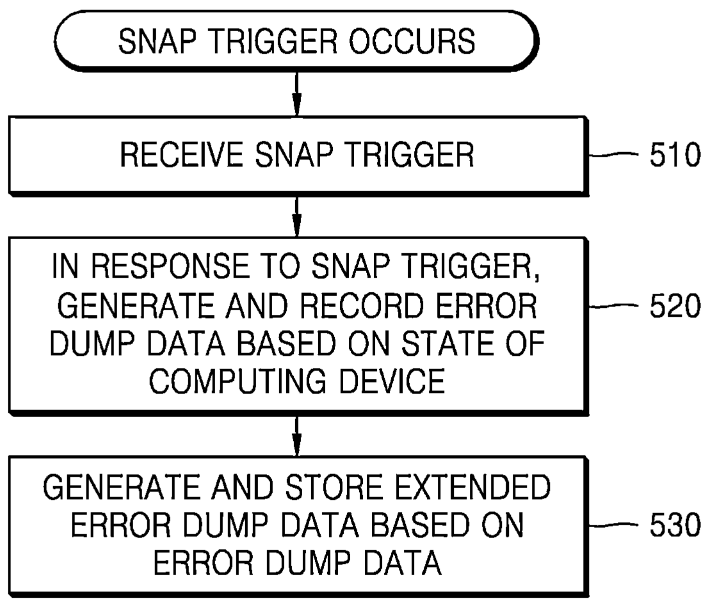
FIG. 5 is a flowchart for describing a process in which, when a snap trigger occurs, a device for collecting data of a computing device manages data for analyzing the cause of a reset, according to an embodiment of the present disclosure.
Figure 6:
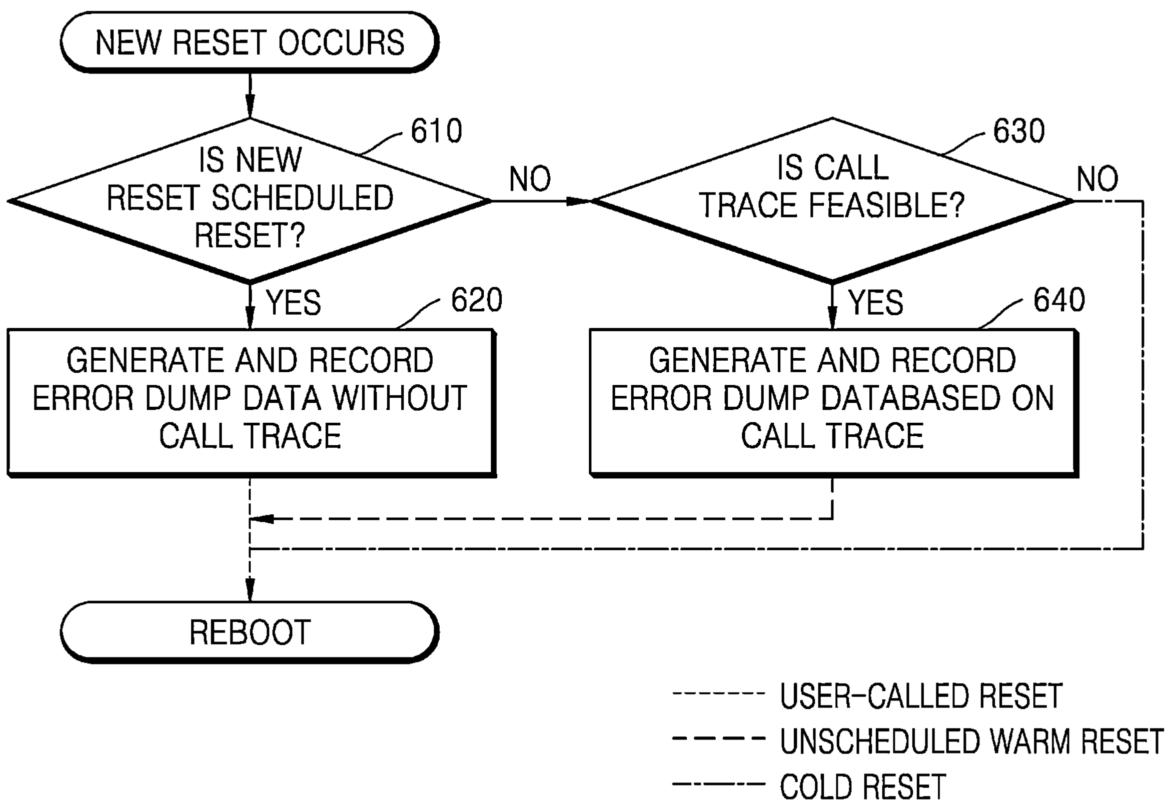
FIG. 6 is a flowchart for describing a process in which, when a new reset occurs, a device for collecting data of a computing device manages data for analyzing the cause of the reset, according to an embodiment of the present disclosure.

The description referring to FIGS. 5 and 6 pertains to a process of, when a particular situation occurs after the computing device is booted, managing (e.g., generating, recording, or storing) data for analyzing the cause of a reset.

FIG. 5 is a flowchart for describing a process in which, when a snap trigger occurs, a device for collecting data of a computing device manages data for analyzing the cause of a reset, according to an embodiment of the present disclosure.

Referring to FIG. 5, in an embodiment, when a snap trigger occurs, the device for collecting data of a computing device may receive the snap trigger (510).

In the present disclosure, the snap trigger may refer to a signal or command for obtaining a state of the computing device. A snap may refer to obtaining a state, information, and the like of a system at a particular time point. A snap trigger may occur when a preset condition is met or by a call of a user.

Referring to FIG. 5, in an embodiment, the device for collecting data of a computing device may, in response to the snap trigger, generate and record error dump data based on a state of the computing device (520). In an embodiment, the error dump data may be recorded in the volatile memory.

In an embodiment, types of state of computing device that serve as the basis for generating error dump data may be preset. For example, the types of state of computing device that serve as the basis for generating error dump data may include information about the cause, and date and time of a reset of an SoC, and the temperature of the SoC, information about allocation of virtual memory and physical memory of a running application, information about the usage rate of each partition in a storage device, information about a history of scheduled tasks, and allocated cores, information about the resource occupancy of tasks, information about the operating time and count of each interrupt, and the like.

The generated and recorded error dump data may then serve as the basis for an operation of generating and storing extended error dump data in the process described above with reference to FIGS. 3 and 4, or for analysis of the cause of other resets.

Referring to FIG. 5, in an embodiment, the device for collecting data of a computing device may generate and store extended error dump data based on the error dump data (530). In an embodiment, the extended error dump data may be stored in the non-volatile memory.

Meanwhile, because the process illustrated in FIG. 5 is not related to a case in which a new reset occurs, unlike a process illustrated in FIG. 6 to be described below, after the device for collecting data of a computing device generates and stores the extended error dump data based on the error dump data (530), the computing device may be continuously operated.

FIG. 6 is a flowchart for describing a process in which, when a new reset occurs, a device for collecting data of a computing device manages data for analyzing the cause of the reset, according to an embodiment of the present disclosure.

Referring to FIG. 6, in an embodiment, when a new reset occurs, the device for collecting data of a computing device may determine whether the new reset is a scheduled reset (610).

Referring to FIG. 6, in an embodiment, when the new reset is a scheduled reset, the device for collecting data of a computing device may generate and record error dump data without a call trace (620). The call trace will be described below.

In the present embodiment, when the new reset is a scheduled reset, the device for collecting data of a computing device may generate error dump data based on a state of the computing device, without an additional call tracing process, and thus, call tracing may be omitted.

In the present embodiment, types of state of computing device that serve as the basis for generating error dump data may be preset. For example, the types of state of computing device that serve as the basis for generating error dump data may include information about the cause, and date and time of a reset of an SoC, and the temperature of the SoC, information about allocation of virtual memory and physical memory of a running application, information about the usage rate of each partition in a storage device, information about a history of scheduled tasks, and allocated cores, information about the resource occupancy of tasks, information about the operating time and count of each interrupt, and the like.

In an embodiment, the generated error dump data may be recorded in the volatile memory.

In an embodiment, the recording of the error dump data in the volatile memory by the device for collecting data of a computing device may include recording a log from a kernel. That is, in an embodiment, the error dump data and the log from the kernel may be recorded together in the volatile memory.

Referring to FIG. 6, after the device for collecting data of a computing device generates and records the error dump data (620), the computing device may be rebooted. The series of processes described above may be understood as a "user-called reset" process.

Referring to FIG. 6, in an embodiment, when the new reset is an unscheduled reset, the device for collecting data of a computing device may determine whether a call trace is feasible (630).

Referring to FIG. 6, in an embodiment, when a call trace is feasible, the device for collecting data of a computing device may generate and record error dump data based on a call trace (640).

In the present disclosure, a call trace may refer to tracing information in which function calls are recorded during execution of a program. It is possible to identify in which function an error has occurred, through a call trace. In detail, a call trace may include tracing the last operation performed by a processor before a new reset occurs. The last operation performed by the processor may be tracked via a program counter.

In the present embodiment, types of state of computing device that serve as the basis for generating error dump data through a call trace may be preset. For example, the types of state of computing device that serve as the basis for generating error dump data through a call trace may include information about the cause, and date and time of a reset of an SoC, and the temperature of the SoC, information about allocation of virtual memory and physical memory of a running application, information about the usage rate of each partition in a storage device, information about a history of scheduled tasks, and allocated cores, information about the resource occupancy of tasks, information about the operating time and count of each interrupt, and the like.

In an embodiment, the generated error dump data may be recorded in the volatile memory.

In an embodiment, the recording of the error dump data in the volatile memory by the device for collecting data of a computing device may include recording a log from a kernel. That is, in an embodiment, the error dump data and the log from the kernel may be recorded together in the volatile memory.

Referring to FIG. 6, after the device for collecting data of a computing device generates and records the error dump data (640), the computing device may be rebooted. The series of processes described above may be understood as an "unscheduled warm reset" process. For example, the unscheduled warm reset process may correspond to a case in which, in response to an unexpected operation or issue occurring in the kernel, an exceptional situation or error (e.g., a kernel exception) occurs.

Referring to FIG. 6, when the device for collecting data of a computing device cannot perform a call trace, the computing device may be rebooted without a separate process. This process may be understood as a "cold reset" process.

In the present disclosure, it may be understood that, when a reboot is started after the process illustrated in FIG. 6, the processes illustrated in FIGS. 3 and 4 are started.

As described above, the stored extended error dump data may be queried by the user. In an embodiment, the extended error dump data may be stored in the non-volatile memory, and the user may query the extended error dump data via the non-volatile memory.

In the present disclosure, the user may check various pieces of information through the extended error dump data.

For example, information that may be identified through the extended error dump data may include the cause, and date and time of a reset of an SoC, and temperature information about the SoC. In an embodiment, the cause, and date and time of a reset of the SoC, and temperature information about the SoC may be obtained in the generating (430) of the error dump data based on the information about the SoC illustrated in FIG. 4, the generating and storing (520) of the error dump data based on the state of the computing device in response to a snap trigger illustrated in FIG. 5, the generating and storing (620) of the error dump data without a call trace illustrated in FIG. 6, or the generating and storing (640) of the error dump data based on a call trace illustrated in FIG. 6.

For example, information that may be identified through the extended error dump data may include a log from a bootloader, or a log from a kernel. In an embodiment, the log from the bootloader may be obtained in the generating and storing (340) of the extended error dump data illustrated in FIG. 3. In an embodiment, the log from the kernel may be obtained in the generating and recording (620) of the error dump data without a call trace illustrated in FIG. 6, or in the generating and recording (640) of the error dump data based on a call trace illustrated in FIG. 6.

For example, information that may be identified through the extended error dump data may include information about allocation of virtual memory and physical memory of a running application. In an embodiment, the information about allocation of virtual memory and physical memory of a running application may be obtained in the generating and recording (520) of the error dump data based on the state of the computing device in response to a snap trigger illustrated in FIG. 5, the generating and recording (620) of the error dump data without a call trace illustrated in FIG. 6, or the generating and recording (640) of the error dump data based on a call trace illustrated in FIG. 6.

For example, information that may be identified through the extended error dump data may include information about the usage rate of each partition in a storage device. In an embodiment, the information about the usage rate of each partition in a storage device may be obtained in the generating and recording (520) of the error dump data based on the state of the computing device in response to a snap trigger illustrated in FIG. 5, the generating and recording (620) of the error dump data without a call trace illustrated in FIG. 6, or the generating and recording (640) of the error dump data based on a call trace illustrated in FIG. 6.

For example, information that may be identified through the extended error dump data may include information about a history of scheduled tasks, and allocated cores. In an embodiment, the information about a history of scheduled tasks, and allocated cores may be obtained in the generating and recording (520) of the error dump data based on the state of the computing device in response to a snap trigger illustrated in FIG. 5, the generating and recording (620) of the error dump data without a call trace illustrated in FIG. 6, or the generating and recording (640) of the error dump data based on a call trace illustrated in FIG. 6.

For example, information that may be identified through the extended error dump data may include information about the resource occupancy of tasks. In an embodiment, the information about the resource occupancy of tasks may be obtained in the generating and recording (520) of the error dump data based on the state of the computing device in response to a snap trigger illustrated in FIG. 5, the generating and recording (620) of the error dump data without a call trace illustrated in FIG. 6, or the generating and recording (640) of the error dump data based on a call trace illustrated in FIG. 6.

For example, information that may be identified through the extended error dump data may include information about the operating time and count of each interrupt. In an embodiment, the information about the operating time and count of each interrupt may be obtained in the generating and recording (520) of the error dump data based on the state of the computing device in response to a snap trigger illustrated in FIG. 5, the generating and recording (620) of the error dump data without a call trace illustrated in FIG. 6, or the generating and recording (640) of the error dump data based on a call trace illustrated in FIG. 6.

For example, information that may be identified through the extended error dump data may include information about a trace of a system call that has caused a kernel restart. In an embodiment, the information about a trace of a system call that has caused a kernel restart may be obtained in the generating and recording (640) of the error dump data based on a call trace illustrated in FIG. 6.

In the present disclosure, the device for collecting data of a computing device may generate an analysis interface based on the extended error dump data. The analysis interface may be configured to display various pieces of information that may be obtained through the extended error dump data described above.

In an embodiment, the device for collecting data of a computing device may display the generated analysis interface.

Figure 7:
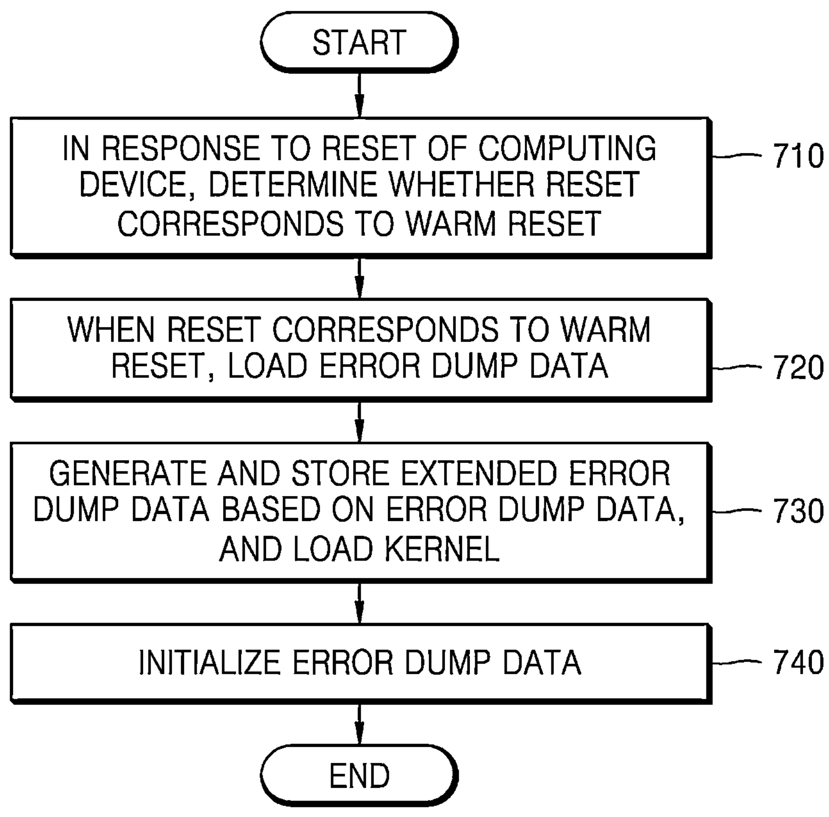
FIG. 7 is a flowchart of a method of collecting data of a computing device, according to an embodiment of the present disclosure.

FIG. 7 is a flowchart of a method of collecting data of a computing device, according to an embodiment of the present disclosure.

The operations illustrated in FIG. 7 may be performed by the device for collecting data of a computing device described above. In detail, the operations illustrated in FIG. 7 may be performed by a processor included in the device for collecting data of a computing device described above.

In operation 710, the device for collecting data of a computing device may, in response to a reset of the computing device, determine whether the reset corresponds to a warm reset.

In operation 720, when the reset corresponds to a warm reset, the device for collecting data of a computing device may load error dump data.

In an embodiment, the error dump data may have been recorded in the volatile memory.

In an embodiment, whether the reset is a warm reset may be determined by verifying the validity of data in a reserved region of the volatile memory.

In operation 730, the device for collecting data of a computing device may generate and store extended error dump data based on the error dump data, and load a kernel.

In an embodiment, the extended error dump data may be stored in the non-volatile memory.

In an embodiment, operation 730 may include storing a log from a bootloader.

In operation 740, the device for collecting data of a computing device may initialize the error dump data.

In an embodiment, after operation 740, the device for collecting data of a computing device may determine whether the reset corresponds to a cold reset.

In an embodiment, when the reset corresponds to a cold reset, the device for collecting data of a computing device may generate error dump data based on the cause, and date and time of the reset, and temperature information.

In an embodiment, whether the reset is a cold reset may be determined based on a reset-reason-register.

In an embodiment, after operation 740, when a snap trigger for obtaining a state of the computing device occurs, the device for collecting data of a computing device may receive the snap trigger.

In an embodiment, the device for collecting data of a computing device may, in response to the snap trigger, generate and record error dump data based on a state of the computing device.

In an embodiment, the device for collecting data of a computing device may generate and store extended error dump data based on the error dump data.

In an embodiment, after operation 740, when a new reset occurs, the device for collecting data of a computing device may determine whether the new reset is a scheduled reset.

In an embodiment, when the new reset is an unscheduled reset, the device for collecting data of a computing device may determine whether a call trace is feasible.

In an embodiment, when a call trace is feasible, the device for collecting data of a computing device may generate and record error dump data based on a call trace.

In an embodiment, when the new reset is a scheduled reset, the device for collecting data of a computing device may generate and record error dump data without a call trace.

Figure 8:
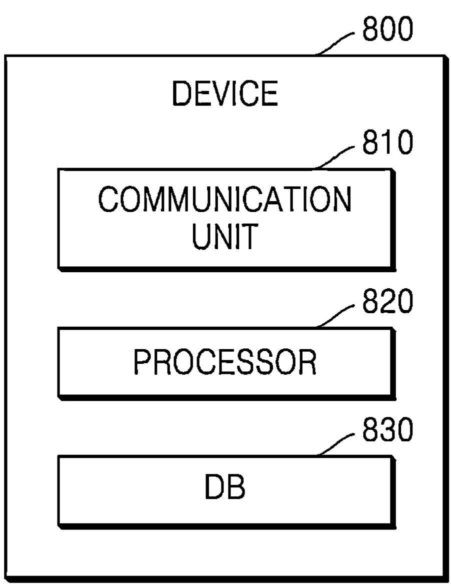
FIG. 8 is a block diagram of a device for collecting data of a computing device, according to an embodiment of the present disclosure.

FIG. 8 is a block diagram of a device for collecting data of a computing device, according to an embodiment of the present disclosure.

Referring to FIG. 8, a device 800 for collecting data of a computing device may include a communication unit 810, a processor 820, and a database (DB) 830. In the device 800 for collecting data of a computing device of FIG. 8, only components related to an embodiment are illustrated. Therefore, it would be understood by those of skill in the art that other general-purpose components may be further included in addition to those illustrated in FIG. 8.

The communication unit 810 may include one or more components for performing wired/wireless communication with an external server or an external device. For example, the communication unit 810 may include at least one of a short-range communication unit (not shown), a mobile communication unit (not shown), and a broadcast receiver (not shown).

The DB 830 is hardware for storing various pieces of data processed inside the device 800 for collecting data of a computing device, and may store a program for the processor 820 to perform processing and control. The DB 830 may store payment information, user information, and the like.

The DB 830 may include RAM such as DRAM or SRAM, ROM, EEPROM, a compact disc-ROM (CD-ROM), a Blu-ray or other optical disk storage, an HDD, an SSD, or flash memory.

The processor 820 controls the overall operation of the device 800 for collecting data of a computing device. For example, the processor 820 may execute programs stored in the DB 830 to control the overall operation of an input unit (not shown), a display (not shown), the communication unit 810, the DB 830, and the like. The processor 820 may execute programs stored in the DB 830 to control the operation of the device 800 for collecting data of a computing device.

The processor 820 may control at least some of the operations of the device 800 for collecting data of a computing device described above with reference to FIGS. 1 to 7.

The processor 820 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

In an embodiment, the device 800 for collecting data of a computing device may be a mobile electronic device. For example, the device 800 for collecting data of a computing device may be implemented as a smart phone, a tablet PC, a PC, a smart TV, a personal digital assistant (PDA), a laptop, a media player, a navigation system, a camera-equipped device, and other mobile electronic devices. In addition, the device 800 for collecting data of a computing device may be implemented as a wearable device having a communication function and a data processing function, such as a watch, glasses, a hair band, or a ring.

In another embodiment, the device 800 for collecting data of a computing device may be an electronic device to be embedded in a vehicle. For example, the device 800 for collecting data of a computing device may be an electronic device that is manufactured and then inserted into a vehicle through tuning.

In another embodiment, the device 800 for collecting data of a computing device may be a server located outside a vehicle. The server may be implemented as a computer device or a plurality of computer devices that provide a command, code, a file, content, a service, and the like by performing communication through a network. The server may receive data necessary for determining a movement path of a vehicle from devices mounted on the vehicle, and determine the movement path of the vehicle based on the received data.

In another embodiment, a process performed by the device 800 for collecting data of a computing device may be performed by at least some of a mobile electronic device, an electronic device embedded in a vehicle, and a server located outside a vehicle.

An embodiment of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skilled in the art of computer software. Examples of the computer program may include not only machine code, such as code made by a compiler, but also high-level language code that is executable by a computer by using an interpreter or the like.

According to an embodiment, the method according to various embodiments of the present disclosure may be included in a computer program product and provided. The computer program product may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods according to the present disclosure may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. Also, numerous modifications and adaptations will be readily apparent to those skilled in the art without departing from the spirit and scope of the present disclosure.

Accordingly, the spirit of the present disclosure should not be limited to the above-described embodiments, and all modifications and variations which may be derived from the meanings, scopes and equivalents of the claims should be construed as failing within the scope of the present disclosure.

According to various embodiments of the present disclosure, data loss due to a reset may be prevented by generating and storing data for analyzing the cause of a reset according to a particular situation.

In particular, it is possible to effectively prepare for data loss by ensuring that data is stored in non-volatile memory.

In particular, various embodiments of the present disclosure may be more effective when a computing device is mounted on a vehicle that operates in a variety of driving environments that are not ideal or stable environments.

In addition, data for analyzing the cause of a reset may include various pieces of information, through extended error dump data.

In particular, a log from a kernel, and a log from a bootloader may be included in the data for analyzing the cause of a reset, enabling multilateral and effective analysis of the cause of a reset.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of collecting data of a computing device, the method comprising:

in response to a reset of the computing device, determining whether the reset corresponds to a warm reset;

based on the reset corresponding to the warm reset, loading error dump data;

generating extended error dump data based on the error dump data, storing the generated extended error dump data, and loading a kernel; and initializing the error dump data, wherein the error dump data is data that has been recorded in volatile memory, and the extended error dump data is stored in non-volatile memory, and the method further comprising:

based on a new reset occurring, determining whether the new reset is a scheduled reset;

based on the new reset being the scheduled reset, generating and recording the error dump data without a call trace, and based on the new reset being an unscheduled reset, identifying whether the call trace is feasible; and based on the call trace being feasible, generating and recording the error dump data based on the call trace, and wherein whether the reset corresponds to the warm reset is determined by verifying validity of data in a reserved region of the volatile memory, and wherein the validity of the data in the reserved region of the volatile memory is verified based on a key value of preserved data.

2. The method of claim 1, wherein the storing of the extended error dump data comprises storing a log from a bootloader.

3. The method of claim 1, further comprising:

determining whether the reset corresponds to a cold reset; and in response to the reset corresponding to the cold reset, generating the error dump data based on a cause of the reset, a date of the reset, a time of the reset, and temperature information.

4. The method of claim 1, wherein whether the reset corresponds to the warm reset is determined by verifying validity of data in a reserved region of the volatile memory.

5. The method of claim 3, wherein whether the reset is the cold reset is determined based on a reset-reason-register.

6. The method of claim 1, further comprising:

based on a snap trigger, which is for obtaining a state of the computing device, receiving the snap trigger;

in response to the snap trigger, generating and recording the error dump data based on the state of the computing device; and generating and storing the extended error dump data based on the error dump data.

7. A device for collecting data of a computing device, the device comprising:

memory storing at least one program; and a processor configured to execute the at least one program to, in response to a reset of the computing device, determine whether the reset corresponds to a warm reset, based on the reset corresponding to the warm reset, load error dump data, generate extended error dump data based on the error dump data, store the generated extended error dump data, and load a kernel, and initialize the error dump data, wherein the error dump data is data that has been recorded in volatile memory, and the extended error dump data is stored in non-volatile memory, and the processor further configured to, based on a new reset occurring, determine whether the new reset is a scheduled reset, based on the new reset being the scheduled reset, generate and record the error dump data without a call trace, and based on the new reset being an unscheduled reset, identify whether the call trace is feasible, and based on the call trace being feasible, generate and record the error dump data based on the call trace, and wherein whether the reset corresponds to the warm reset is determined by verifying validity of data in a reserved region of the volatile memory, and wherein whether the validity of the data in the reserved region of the volatile memory is verified based on a key value of preserved data.

8. A non-transitory computer-readable recording medium having recorded thereon a program for causing a computer to execute the method of claim 1.

* * * * *